United States Patent [19]

Nagao et al.

[11] 4,296,953
[45] Oct. 27, 1981

[54] SLIPPING-OFF PREVENTING PIPE JOINT

[75] Inventors: Shozo Nagao; Yoshinobu Ohashi; Yuichi Watanabe; Yoshikazu Wakushima, all of Amagasaki, Japan

[73] Assignee: Kubota, Ltd., Ōsaka, Japan

[21] Appl. No.: 93,613

[22] Filed: Nov. 13, 1979

[30] Foreign Application Priority Data

Dec. 22, 1978 [JP] Japan .................. 53-162499
Dec. 22, 1978 [JP] Japan ............... 53-179613[U]
Dec. 22, 1978 [JP] Japan ............... 53-179614[U]
Dec. 22, 1978 [JP] Japan ............... 53-179615[U]

[51] Int. Cl.³ ........................................... F16L 27/12
[52] U.S. Cl. ........................... 285/302; 285/321; 285/374; 285/403
[58] Field of Search ............... 285/231, 321, 403, 374, 285/404, 302

[56] References Cited

U.S. PATENT DOCUMENTS

| | | | |
|---|---|---|---|
| 2,388,633 | 11/1945 | De Woody | 285/321 X |
| 2,521,127 | 9/1950 | Price | 285/321 |
| 2,727,761 | 12/1955 | Elliott et al. | 285/321 X |
| 2,935,343 | 5/1960 | Ellis | 285/321 X |
| 3,684,320 | 8/1972 | Platzer et al. | 285/374 X |
| 3,765,706 | 10/1973 | Bram | 285/231 |
| 3,899,183 | 8/1975 | Wild et al. | 285/231 X |
| 4,027,904 | 6/1977 | Bram | 285/374 X |
| 4,097,074 | 6/1978 | Nagao et al. | 285/321 X |
| 4,116,478 | 9/1978 | Yamaji et al. | 285/321 X |
| 4,183,560 | 1/1980 | Wyss | 285/374 X |
| 4,183,561 | 1/1980 | Miyamoto et al. | 285/321 |
| 4,194,769 | 3/1980 | Bram | 285/374 X |

FOREIGN PATENT DOCUMENTS 2205000 8/1973 Fed. Rep. of Germany .

Primary Examiner—Thomas F. Callaghan
Attorney, Agent, or Firm—Joseph W. Farley

[57] ABSTRACT

A slip-on type pipe joint including a socket, a spigot and an annular rubber packing disposed on the inner periphery of the socket at an axially intermediate portion thereof and compressible by the outer periphery of the spigot against the inner periphery of the socket to seal the clearance between the socket and the spigot with its restoring force. The joint further comprises an engaging member detachably attached to the inner periphery of the socket at its open end and radially inwardly projecting from the periphery, a protrusion formed on the outer periphery of the spigot and positioned between the packing and the engaging member, and a split lock ring disposed between the protrusion and the engaging member and fitting around the spigot with a diametrically contractive force. The lock ring is engageable with the engaging member and with the protrusion to prevent the spigot from slipping off the socket. For the fabrication of the joint, the packing is checked for proper installation with a gauge, with the spigot inserted in the socket, and the lock ring and the engaging member are thereafter set in position.

6 Claims, 6 Drawing Figures

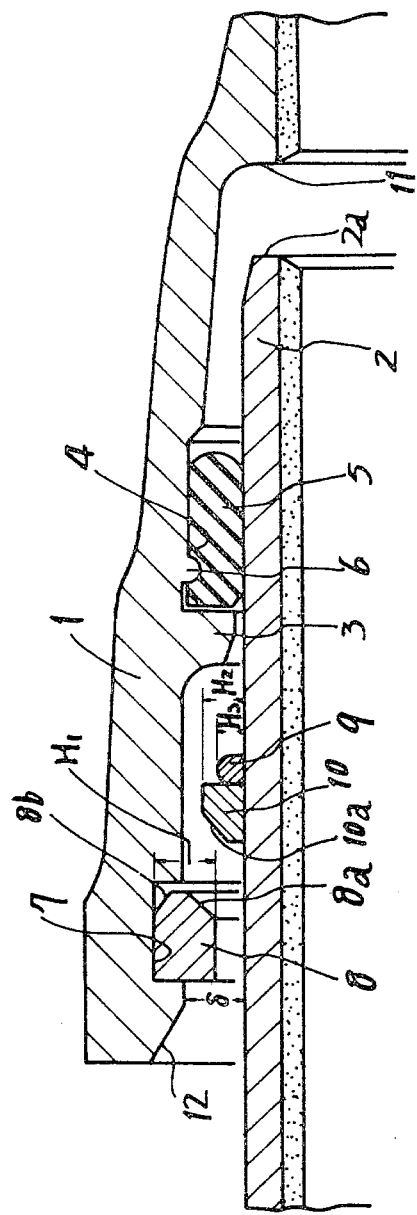

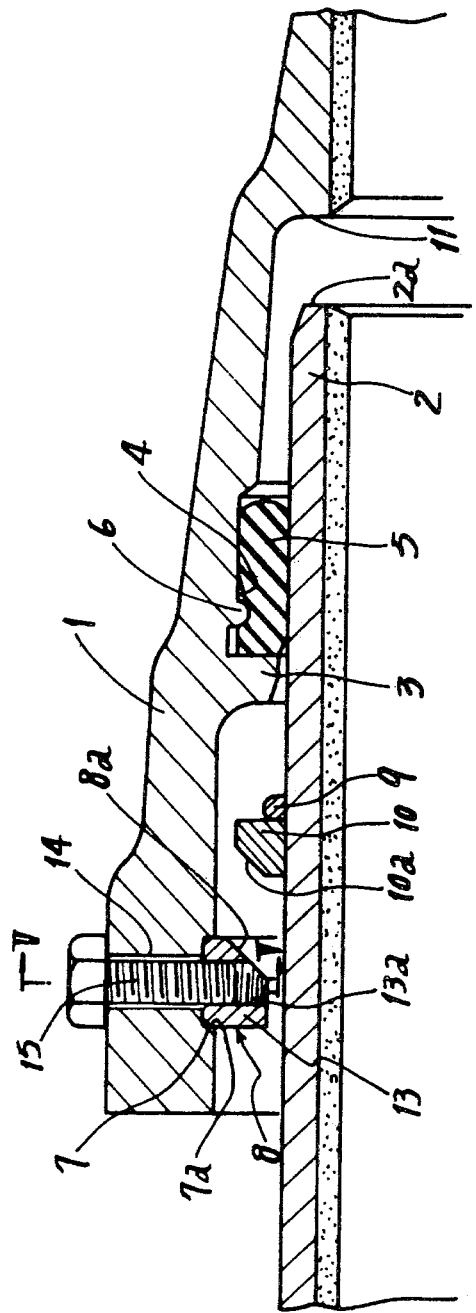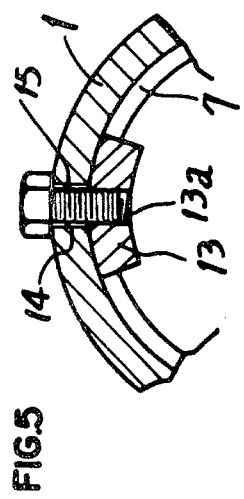

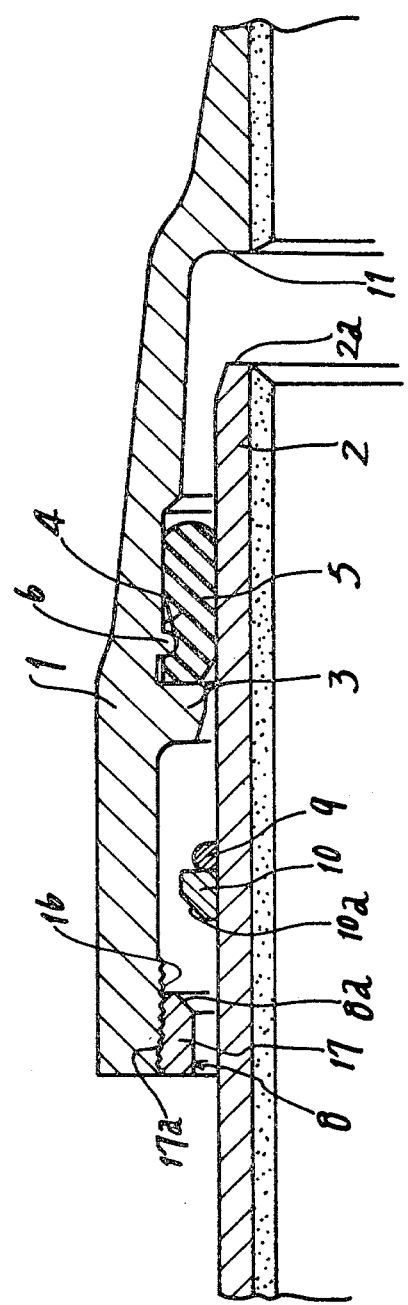

SLIPPING-OFF PREVENTING PIPE JOINT

The present invention relates to a pipe joint for preventing a spigot from slipping off from a socket, and more particularly to a slip-on type pipe joint having slipping-off preventing means comprising engaging members provided on a socket and on a spigot and engageable with each other axially thereof.

Slip-on type pipe joints comprise a socket having a seal accommodating portion in its inner periphery, a spigot insertable into the socket and a seal retained in the accommodating portion and compressible by the outer periphery of the spigot against the accommodating portion when the spigot is inserted into the socket for sealing the clearance between the socket and the spigot with its restoring force. Such pipe joints are well known and have found wide use. Some of the slip-on type pipe joints heretofore proposed have slipping-off preventing means as disclosed in U.S. Pat. No. 4,097,074. The disclosed pipe joint comprises a split lock ring fitting in an annular groove in the outer periphery of a spigot at its forward end with a diametrically contractive force, and a projection projecting radially inward from the inner periphery of a socket and positioned away from a seal inwardly of the socket, the lock ring being engageable with the projection to prevent the spigot from slipping off the socket. With this construction, the seal can be checked for proper installation with ease and the lock ring is thereafter settable in place easily only if the pipe joint has a relatively large diameter such that a person can enter the inside of the joint. DT-OS No. 2205000 discloses another pipe joint comprising a socket with an annular groove formed in its inner periphery and positioned closer to the open socket end than a seal for accommodating a split lock ring before the insertion of a spigot. When the spigot is inserted into the socket to fit the lock ring around the spigot against the diametrically contractive force of the ring, the lock ring is engageable with a projection on the outer periphery of the spigot and with a socket end shoulder portion defining the annular groove to prevent the spigot from slipping off the socket. This pipe joint has the drawback of involving difficulty in checking the seal for proper installation. With slip-on type pipe joints, the seal is likely to be dragged axially inwardly of the socket by the insertion of the spigot into the socket, so that upon completion of insersion, it is necessary to confirm whether or not the seal has been installed in the proper position, whereas in the case of the above-mentioned pipe joint, the shoulder portion, the lock ring and the spigot projection combine to interfere with the insertion of a gauge for checking the installed seal. The pipe joint has another problem that the spigot and the socket are difficult to join because there is the necessity of inserting the spigot into the socket with the lock ring accommodated in the socket to fit the ring around the spigot and further passing the projection through the ring.

U.S. Pat. No. 3,684,320 further discloses a pipe joint of the above type in which the open end shoulder portion is cut out circumferentially considerably for placing an arcuate lock member into the annular groove through the cut-out portion. In this case, the gauge is very easily insertable into the socket through the cut-out portion as well as through the other portion where the lock member is not positioned despite the presence of the shoulder portion. However, the lock member, which, unlike the lock ring, extends only part of the circumference, is not fully satisfactory in its ability to prevent slipping-off and in its reliability.

The main object of the invention is to provide a pipe joint which comprises a socket, a spigot, a seal and slipping-off preventing means and in which the seal can be checked for proper installation easily after the spigot has been inserted into the socket and the slipping-off preventing means is easily settable from outside the joint.

To fulfil this object, the present invention provides a slip-on type pipe joint comprising a socket having a seal accommodating portion in its inner periphery, an engaging member positioned away from the seal accommodating portion toward the opening of the socket axially thereof and detachably attached to the inner periphery of the socket, a spigot having a protrusion formed on its outer periphery and positioned between the seal accommodating portion and the engaging member, and a first lock ring capable of exerting a diametrically contractive force and fittable to the outer periphery of the spigot as positioned between the engaging member and the protrusion. When the spigot moves relative to the socket to slip off therefrom, the lock ring engages with both the engaging member and the protrusion axially of the joint to prevent the spigot from slipping off the socket.

With this construction, the spigot is inserted into the socket with the seal installed in the accommodating portion, the seal is then checked for proper installation, and the first lock ring and the engaging member are thereafter settable in place.

According to a preferred embodiment of the invention, the engaging member comprises a second split lock ring capable of exerting a diametrically expansive force and engageable, from inside the socket axially thereof, with a radially extending face forming a stepped portion in the inner periphery of the socket and positioned away from the seal accommodating portion toward the socket opening, preferably with a side face defining an annular groove formed in the inner surface of the socket. With this construction, the second lock ring needs only to be pushed into the socket through the annular space in the socket opening around the spigot. The engaging member is therefore easy to install and functions to prevent the spigot from slipping off with high reliability.

According to another preferred embodiment, the first lock ring has a conical surface tapered toward the socket opening and engageable with a conical surface formed on the engaging member (second lock ring). With this construction, when the spigot moves relative to the socket for slipping off, causing the first lock ring to engage the engaging member, the slipping-off force acting on these two members presses the first lock ring against the outer periphery of the spigot and the engaging member against the inner periphery of the socket. This assures the engagement between the first lock ring and the protrusion against inadvertent disengagememt and effectively holds the engaging member, especially the second lock ring, to the radially extending face or in the annular groove, consequently preventing the slipping-off of the spigot with enhanced reliability.

According to still another preferred embodiment, the protrusion on the outer periphery of the spigot, which can be a low protrusion because of the presence of the first lock ring, can be provided by weld beads with ease.

Various other features and advantages of the invention will become apparent from the following description of the preferred embodiments given with reference to the accompanying drawings, in which:

FIG. 2 is a view in vertical section showing a second embodiment of the invention;

FIG. 3 is a fragmentary view in section showing the second embodiment immediately before a second lock ring is set in position;

FIG. 4 is a view in vertical section showing a third embodiment of the invention;

FIG. 5 is a view in section taken along the line V—V in FIG. 4; and

FIG. 6 is a view in vertical section showing a fourth embodiment of the invention.

Throughout the drawings, like parts are referred to by like reference numerals.

Figure 1:
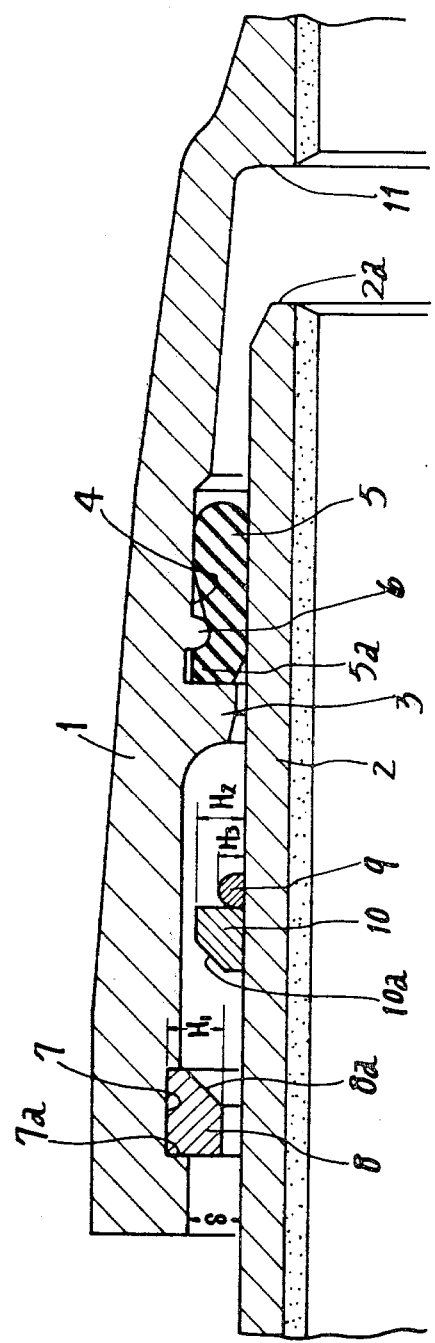
FIG. 1 is a view in vertical section showing a first embodiment of the invention.

With reference to the first embodiment of FIG. 1, indicated at 1 is a socket formed at one end of a pipe, and at 2 a spigot at one end of another pipe to be joined to the pipe. An annular projection 3 formed on the inner surface of the socket 1 at an axially intermediate portion thereof is loosely fittable around the spigot 2 with a clearance therebetween so as to facilitate the insertion of the spigot 2 into the socket 1. On one side of the projection axially inward of the socket, there is formed a seal accommodating portion 4 in the form of an annular recess. An annular seal 5 of rubber fitted in the accommodating portion 4 is compressed by the outer periphery of the spigot 2 against the portion 4, sealing the clearance between the socket 1 and the spigot 2 with its elastic restoring force. An engaging projection 6 is provided on the bottom of the seal accommodating portion 4 to axially engage a projection 5a on the outer periphery of the seal 5. The engaging projection 6 serves to prevent the seal 5 from being dragged by the spigot 2 when it is inserted into the socket 1. An annular groove 7 is formed in the inner surface of the socket 1 close to its opening. A second lock ring serving as an engaging member 8 is fitted in the annular groove 7. The second lock ring 8 is divided at a portion along its periphery, is capable of exerting a diametrically expansive force and provides an engaging portion radially inwardly projecting from the inner surface of the socket 1 when the outer peripheral portion of the ring is fitted in the annular groove 7. In place of the annular groove 7, the open end of the socket 1 may be provided with an annular projection radially inwardly projecting from the socket inner surface. In either case, it is desired that the socket 1 be provided, at a location close to its open end, with a radially extending face 7a which forms a stepped portion in the inner periphery of the socket and with which the engaging member 8 is engageable from inside the socket axially thereof. The annular groove 7, if formed, serves to retain the engaging member 8 with improved reliability. An annular protrusion 9 provided by weld beads is formed on the outer surface of the spigot 2 at a position between the projection 3 and the engaging member 8. Provided between the protrusion 9 and the engaging member 8 is a first split lock ring 10 fitting around the spigot 2 with a diametrically contractive force. When the socket 1 and the spigot 2 move relative to each other for slipping off, the first lock ring 10 axially engages with both the engaging member 8 and the protrusion 9. The first lock ring 10 has a conical surface 10a tapered toward the socket opening and opposed to, and engageable with, a conical surface 8a formed on the engaging member, i.e. second lock ring 8.

The wall thickness $H_1$ of the second lock ring 8 and the wall thickness $H_2$ of the first lock ring 10 are smaller than the clearance $\delta$ between the inner surface of the open end of the socket 1 and the outer surface of the spigot 2. The lock rings 8 and 10 can be inserted into an annular space between the inner surface of the socket 1 and the outer surface of the spigot 2 through the clearance $\delta$.

With the construction described above, the engaging member (second lock ring) 8 in engagement with the radial face 7a of the socket 1 is engageable with the protrusion 9 on the spigot, with the first lock ring 10 interposed therebetween, whereby the spigot 2 is prevented from slipping off the socket 1. The socket 1 and the spigot 2 are axially movable relative to each other between the position where the first lock ring 10 engages with both the engaging member 8 and the protrusion 9 and the position where the protrusion 9 engages the projection 3 or the forward end 2a of the spigot 2 engages a radial face 11 of the socket 1 at its inner end. When the socket 1 and the spigot 2 move relative to each other for slipping off, bringing the two lock rings 8 and 10 into engagement with each other, the slipping-off force acts to press the lock ring 8 against the bottom of the annular groove 7 and the lock ring 10 against the outer surface of the spigot 2 by virtue of the provision of slanting surfaces 8a and 10a.

The spigot 2 is joined to the socket 1 in the following manner. The seal 5 is press-fitted into the seal accommodating portion 4 of the socket 1, and the spigot 1 is inserted into the socket 2 with the lock rings 8 and 10 placed on the spigot 2 at some temporary position. After the spigot 2 has been inserted to the specified position, a gauge is placed into the clearance between the inner surface of the socket 1 and the outer surface of the spigot 2 into contact with the seal 5 to check whether or not the seal 5 has been properly positioned. Since the lock rings 8 and 10 are located outside the opening of the socket 1 at this time, the lock rings 8 and 10 will not interfere with the gauge when it is inserted into the socket from outside. Since the protrusion 9 on the spigot 2 is adapted to engage with the second lock ring 8 by way of the first lock ring 10, the height $H_3$ of the protrusion 9 can be smaller than when it is engageable directly with the second lock ring 8. Despite the presence of the protrusion 9, therefore, the gauge is smoothly insertable. A TV camera is usable in place of the gauge. After the position of the seal 5 has been confirmed, the first lock ring 10 is slidingly brought to the specified position. Subsequently the second lock ring 8 is inserted into the socket 1 as diametrically contracted and placed into the annular groove 7.

A second embodiment will now be described with reference to FIGS. 2 and 3. The second embodiment is of the same construction as the first except that it is provided with an expedient for facilitating the installation of the second lock ring 8. The second lock ring 8 is formed, at an outer peripheral edge thereof axially inward of the socket, with a face 8b tapered inwardly of the socket, while the socket 1 is provided, at the inner peripheral edge of its opening, with a tapered face 12 substantially in conformity with the tapered face 8b. The second lock ring 8 can be installed in the socket 1 by abutting the tapered end 8b of the ring 8 against the tapered end 12 of the socket 1 as seen in FIG. 3 and thereafter striking the second lock ring 8 into the socket 1 axially thereof as by a hammer, diametrically contacting the ring 8 against its biasing force. Either one of the tapered faces 8b and 12 may be formed.

With reference to FIGS. 4 and 5, a third embodiment will be described, which differs from the first embodiment in the construction of the engaging member 8. The engaging member 8 of the third embodiment comprises a plurality of arcuate segments 13 fitted in the annular groove 7 in place of the second lock ring of the first embodiment. Each of the segments 13 is secured to the bottom of the annular groove 7 with a headed bolt 15 inserted into the socket 1 from outside through a hole 14 in the socket wall and screwed into a threaded bore 13a formed in the segment 13. Instead of the annular groove 7, recesses may be formed for the segments 13, or the radially extending face 7a alone may be formed. With this construction, the engaging projection on the socket can be provided merely by attaching the segments 13 to the socket 1 with the bolts 15. In some cases, this provides a joint with greater ease than with the use of the second lock ring 8 which acts to expand diametrically.

With reference to FIG. 6, a fourth embodiment will be described, which differs from the first embodiment also in the construction of the engaging member 8. Unlike the second lock ring used in the first embodiment, the engaging member 8 comprises a ring 17 screwed into an internally threaded portion 16 formed on the inner periphery of the socket 1 at its open end. The ring 17 has on its outer periphery an externally threaded portion 17a engageable with the internally threaded portion 16. The ring is formed with a tapered face 8a at an inner peripheral edge thereof positioned axially inward of the socket. The ring 17, when merely screwed into the open end of the socket 1, provides an engaging projection on the socket.

What is claimed is:

1. In a pipe joint comprising a socket having a seal accomodating portion in its inner periphery, a spigot insertable into the socket, and an annular seal retained in the accomodating portion and compressively engageable by the outer periphery of the spigot against the accomodating portion for sealing the clearance between the socket and the spigot when the spigot is inserted into the socket, the improvement wherein:

an engaging member comprising a second split lock ring is detachably attached to the inner periphery of the socket and is positioned away from the seal accomodating portion toward the opening of the socket, the second split lock ring being capable of exerting a diametrically expansive force and being engageable from inside the socket axially thereof with a radially inwardly extending face forming a stepped portion on the inner periphery of the socket between the second split lock ring and the socket opening, the second split lock ring providing an engaging portion projecting radially inward from the inner periphery of the socket;

a protrusion is formed on the outer periphery of the spigot and is positioned between the seal accomodating portion and the engaging member on the socket;

a first split lock ring capable of exerting a diametrically contractive force is fitted to the outer periphery of the spigot between the protrusion on the spigot and the engaging member on the socket, the first lock ring being normally spaced from and engageable with the engaging portion of said engaging member and with said protrusion in response to relative axial separating movement between the socket and spigot; and each of said first and second lock rings has a radial thickness less than the radial clearance between the inner surface of the socket opening and the outer surface of the spigot whereby said lock rings are insertable through said clearance to their respective assembled positions after the spigot has been inserted into the socket and into compressive engagement with said annular seal.

2. A pipe joint as defined in claim 1 wherein the first split lock ring is provided with an outwardly facing conical surface and the second split lock ring is provided with an inwardly facing conical surface, said conical surfaces being engageable in response to said relative axial separating movement to increase the contractive force of the first split lock ring and the expansive force of the second split lock ring.

3. A pipe joint as defined in claim 1 wherein a face tapered inwardly of the socket is formed on the outer peripheral edge of the second split lock ring which is axially inward of the socket.

4. A pipe joint as defined in claim 1 wherein an annular groove defined by a pair of axially opposed side surfaces is formed in the inner surface of the socket and is engageable by the second split lock ring, said radially inwardly extending face being the side surface of the pair positioned closer to the socket opening.

5. A pipe joint as defined in claim 1, 2, 3 or 4 wherein the protrusion comprises weld beading formed on the outer surface of the spigot.

6. In a pipe joint comprising a socket having a seal accomodating portion in its inner periphery, a spigot insertable into the socket, and an annular seal retained in the accomodating portion and compressively engageable by the outer periphery of the spigot against the accomodating portion for sealing the clearance between the socket and the spigot when the spigot is inserted into the socket, the improvement wherein:

an engaging member comprising a plurality of segments are detachably attached to the inner periphery of the socket and are positioned away from the seal accomodating portion toward the opening of the socket, each segment being engageable from inside the socket axially thereof with a radially inwardly extending face forming a stepped portion on the inner periphery of the socket between the segment and the socket opening, each segment being secured to the inner periphery of the socket with a bolt extending through the wall of the socket from outside, and the segments providing an engaging portion projecting radially inward from the inner periphery of the socket;

a protrusion is formed on the outer periphery of the spigot and is positioned between the seal accomodating portion and the engaging member on the socket;

a first split lock ring capable of exerting a diametrically contractive force is fitted to the outer periphery of the spigot between the protrusion on the spigot and the engaging member on the socket, the first lock ring being normally spaced from and engageable with the engaging portion of said engaging member and with said protrusion in response to relative axial separating movement between the socket and spigot; and said first lock ring and said segments each has a radial thickness less than the radial clearance between the inner surface of the socket opening and the outer surface of the spigot whereby said first lock ring and said segments are insertable through said clearance to their respective assembled positions after the spigot has been inserted into the socket and into compressive engagement with said annular seal.

* * * * *